Patented July 12, 1938

2,123,457

UNITED STATES PATENT OFFICE 2,123,457

STABILIZED WHITE OIL

Robert E. Wilson, Chicago, Ill., assignor to Standard Oil Company, Chicago, Ill., a corporation of Indiana No Drawing. Application January 16, 1931, Serial No. 509,261. Renewed December 6, 1937

7 Claims. (Cl. 167—28)

This invention relates to stabilized white oil and it pertains more particularly to an oil which may be safely used under extreme climatic conditions as a summer spray for sensitive foliage.

It is well known that even highly purified mineral oils sometimes cause burning or other injurious effects on sensitive foliage. When a highly refined mineral oil consisting chiefly of saturated hydrocarbons is exposed in thin films on plant leaves in the presence of sunlight, it is subjected to atmospheric oxygen under such conditions that the oil may be partially converted into acids, aldehydes and/or peroxides. The oils themselves may be perfectly harmless and may offer no ill effects on the respiratory system of the plant, but the acids and other products formed by oxidation cause severe burning and/or other injury to the leaves. The object of my invention is to provide a means for stabilizing highly purified oils, such as white oil, against oxidation so that they may be safely used as summer sprays on sensitive foliage. Other objects will be apparent as the detailed description of my invention proceeds.

I have found that purified mineral oils of this type may be stabilized by the addition thereto of amino-hydroxy-aromatic compounds such as aminophenols, substituted aminophenols, aminonaphthol, and equivalent substances. These substances, when added to the oil in minute amounts, have the power of inhibiting the oxidation of the oil and preventing the formation of toxic substances. I prefer to use those oxidation inhibitors which are preferentially soluble in white oil so that they will not be lost in droplets of water which separate from the oil when a quick breaking emulsion is applied to a surface, and so that they will not be washed from the oil film by rain. The combination of the amino group with the aromatic hydroxyl group is particularly effective in preventing the formation of acids and peroxides in highly treated mineral oils.

In practicing my invention I add to a highly purified mineral oil a very small proportion (usually not more than 0.1%) of aromatic compounds containing both the hydroxyl and amino groups which are attached to the ring structure. For example, I may use—

Ortho-aminophenol
Para-aminophenol
Para-methylaminophenol
Para-benzylaminophenol
Dibutylaminophenol, or
1,2 aminonaphthol My tree spray may be made from technical white oil having a viscosity of 50–100 seconds Saybolt at 100° F. The term "white oil", as is well known in the petroleum industry, is a petroleum fraction heavier than kerosene which has been treated with concentrated or fuming sulfuric acid to remove asphaltic compounds, unsaturated hydrocarbons, and/or other substances which are deleterious to plant life.

The quantity of inhibitor added to the oil may vary from about .002% to 0.2%. In general, however, I prefer to use less than 0.1% and usually .05% will be found effective. The exact amount will depend upon the conditions of each case, the nature of the oil, climatic conditions, solubility of the inhibitor in the oil, etc. The inhibitor is preferably dissolved in the oil before the oil is emulsified.

When employing the highly active inhibitors of the aminophenol type I find it necessary to avoid the use of alkaline solutions containing alkaline soap and salts which hydrolyze to give an alkaline reaction. Neutral solutions are satisfactory but I prefer to employ solutions containing a small amount of a weak, water-soluble acid, such as acetic acid.

I prefer to market the tree spray in the form of an emulsion base which may be prepared by emulsifying two volumes of oil in one volume of water containing about 5–10% of an emulsifying agent and a preservative. The emulsifying agent may be glue, dextrin, gum tragacanth, or gum ghatti and the preservative may be cresylic acid, formaldehyde or wood creosote. Insecticides may also be incorporated, such as rotenone, pyrethrum, nicotine, etc. The emulsion base or "concentrate" is preferably mixed in a colloid mill to obtain the proper degree of dispersion and stability, after which it may be shipped to the point where it is required for application. A considerable amount of time may elapse in shipment and storage during which oxidation of the oils may proceed, and I have found that the aminophenol inhibitors are of great value in preventing these undesirable reactions and maintaining the stability of the base or concentrate before application to the foliage as well as for inhibiting oxidation on the plant leaf itself.

In the field the base or concentrate is mixed with about 50 or 75 times its volume of water and is applied to foliage as a spray. The spray may, of course, be used during the dormant season, but it is designed particularly for sensitive foliage. It is particularly effective in controlling coddling moth, aphis, fruit tree scale and other parasites.

While I have described my invention as a summer tree spray I do not limit myself to any particular use; it is obvious that a stabilized white oil of this type may be used for any other purpose where stability, neutrality and resistance to oxidation are important.

I claim:

1. A spray for vegetation with green foliage comprising an emulsion of a highly refined mineral oil having a viscosity from 50 to 100 seconds Saybolt at 100° F. and a small proportion of an alkyl substituted aminophenol dissolved in said oil.

2. The method of preventing highly refined petroleum oils from injuring vegetation when applied thereto, which comprises dissolving in said oil a small proportion of a para methyl aminophenol.

3. The method of preventing highly refined petroleum oils from injuring vegetation when applied thereto, which comprises dissolving in said oil a small proportion of an alkyl aminophenol.

4. The method of preventing highly refined viscous petroleum oils from deteriorating and forming acidic bodies, which comprises dissolving in said oil an alkyl aminophenol in an amount not exceeding 0.005%.

5. The method of preventing highly refined viscous petroleum oils from deteriorating and forming acidic bodies, which comprises dissolving in said oil a small proportion of di-butyl aminophenol.

6. The method of preventing highly refined viscous petroleum oils from deteriorating and forming acidic bodies, which comprises dissolving in said oil a small proportion of para-methyl aminophenol.

7. The method of preventing highly refined viscous petroleum oils from deteriorating and forming acidic bodies, which comprises dissolving in said oil a small proportion of an alkyl aminophenol in which the alkyl group contains from 1 to 4 carbon atoms.

ROBERT E. WILSON.